(12) United States Patent
Cacioppo et al.

(10) Patent No.: US 11,345,546 B2
(45) Date of Patent: May 31, 2022

(54) WAREHOUSE AUTOMATION SYSTEM METHODS AND APPARATUS

(71) Applicant: 6 River Systems, LLC, Waltham, MA (US)

(72) Inventors: Christopher Cacioppo, Somerville, MA (US); Tim Higgins, Somerville, MA (US); Tucker Kelman Moffat, Stoneham, MA (US); Joshua Chaitin-Pollak, Acton, MA (US); Charles Christopher Lingamfelter, Rye, NH (US)

(73) Assignee: 6 RIVER SYSTEMS, INC., Waltham, MA (US)

( * ) Notice: Subject to any disclaimer, the term of this patent is extended or adjusted under 35 U.S.C. 154(b) by 291 days.

(21) Appl. No.: 16/587,032

(22) Filed: Sep. 29, 2019

(65) Prior Publication Data

US 2021/0061566 A1    Mar. 4, 2021

Related U.S. Application Data

(60) Provisional application No. 62/897,997, filed on Sep. 9, 2019, provisional application No. 62/894,964, filed on Sep. 2, 2019.

(51) Int. Cl.
*B65G 1/137* (2006.01)
*G05B 15/02* (2006.01)

(52) U.S. Cl.
CPC .......... *B65G 1/1375* (2013.01); *G05B 15/02* (2013.01)

(58) Field of Classification Search
CPC combination set(s) only.
See application file for complete search history.

(56) References Cited

U.S. PATENT DOCUMENTS

2011/0035247 A1   2/2011  Perry et al.
2013/0317642 A1*  11/2013 Asaria ............... G06Q 10/08
                                          700/216

(Continued)

FOREIGN PATENT DOCUMENTS

KR    10-2018-0109120 A    8/2018

OTHER PUBLICATIONS

Notification of Transmittal of the International Search Report and the Written Opinion of the International Searching Authority, International Search Report and Written Opinion of the International Searching Authority from PCT/US 2020/048962 dated Dec. 17, 2020, 11 pages.

*Primary Examiner* — Kyle O Logan
(74) *Attorney, Agent, or Firm* — Foley & Lardner LLP

(57) ABSTRACT

Methods and apparatus for efficiently fulfilling product orders corresponding are described. Order items are divided into those which are to be automatically picked using an automated pick cell including a loader, such as a robotic arm, storage buffers and an apparatus for transferring the automatically picked items onto a robotic cart. The manually picked items are picked by a human picker guided by the robotic cart. The manual pick can occur before or after the automatic pick of items. In some embodiments whether items are to be automatically picked before or after the manual pick portion of an order depends on which ordering will allow for packing of the items corresponding to an order into the least number of receptacles, e.g., totes which are transported by the robotic pick carts.

17 Claims, 10 Drawing Sheets

(56) References Cited

U.S. PATENT DOCUMENTS

| | | | |
|---|---|---|---|
| 2016/0019633 A1* | 1/2016 | Waddington | G06Q 10/06311 |
| | | | 705/26.81 |
| 2016/0140488 A1 | 5/2016 | Lindbo | |
| 2017/0278047 A1* | 9/2017 | Welty | G05D 1/0011 |
| 2019/0152703 A1* | 5/2019 | Sellner | B65G 1/1378 |
| 2020/0048005 A1* | 2/2020 | Kraetsch | B65G 1/1378 |

* cited by examiner

| FIGURE 3A |
|---|
| FIGURE 3B |
| FIGURE 3C |
| FIGURE 3D |

FIGURE 3

WAREHOUSE AUTOMATION SYSTEM METHODS AND APPARATUS

RELATED APPLICATIONS

The present application claims the benefit of U.S. Provisional Patent Application Ser. No. 62/894,964, filed Sep. 2, 2019 and U.S. Provisional Patent Application Ser. No. 62/897,997 filed Sep. 9, 2019 both of which are hereby expressly incorporated by reference in their entirety.

FIELD

The present application relates to order processing methods and apparatus, and more particularly, to methods and apparatus for facilitating assembly of product orders using an automated pick cell in combination with one or more robotic carts.

BACKGROUND

Internet and mail orders have grown in popularity due to the convenience of being able to place an order and have it delivered to one's home or place of business. The need to be able to efficiently process an order including multiple items, collect the ordered items and arrange the ordered items into a group, e.g., in one or more totes corresponding to a customer order, for packaging is growing in importance.

One approach to order processing involves the use of a robotic cart to lead a human around a warehouse. A human picker picks items from shelves and places them in one or more totes on the cart with, in some cases, different totes corresponding to different orders. Once the totes have been loaded by the human picker, the items in the totes are packaged for shipment to the individual or individuals who placed the order or orders to which the items in the tote correspond.

The robotic cart/human picker combination is well suited for a large range of applications particularly where a large number of items at different locations in a warehouse are to be included in an order.

While many orders often include one or more items at different locations in a warehouse, some items tend to be ordered relatively frequently with the remaining items in an order being ordered far less frequently.

While attempts to fully automate order picking have been made, automated picking machinery can be costly to implement particularly where infrequently items may be spread out and placed at various locations in a warehouse. In such cases to fully automate the collection of items for an order can be cost prohibitive since it may not be cost effective to cover an entire warehouse with automated picking or dispensing machines and moving such machines can be costly and/or time consuming. In addition automated devices which attempt to load totes or bins to their maximum capacity have a tendency to place items in locations in the bin in a manner where they may fall out when a bin is moved. This is particularly the case when the items are of different sizes and/or shapes are included in an order which is often the case for orders that include a variety of different items. Furthermore, in some cases automatic loading may result in a heavy item being placed on top of a previously loaded lighter item possibly damaging the previously loaded item.

In view of the above, it should be appreciated that there is a need for improved methods and/or apparatus relating to collection and/or assembly of items located in a warehouse to satisfy one or more orders.

SUMMARY

Methods and apparatus of the present invention relate to satisfying orders for items by using a combination of an automated pick cell, also referred to as an auto pick cell, along with one or more robotic carts. In various embodiments, the automated pick cell is used to load one or more receptacles, e.g., totes, corresponding to an order with some items corresponding to the order. For purposes of discussion totes will be used at various locations in the following portions of the application but it is to be understood that other forms of receptacles can be used such as boxes, bins, etc and that the reference to totes is intended to be exemplary and not limiting.

While some items are picked by the automated pick cell, the remaining items for the order are manually picked by a human picker led around the warehouse where the automated pick cell is located so that the remaining items corresponding to the order can be manually picked and placed into the tote or totes corresponding to the order.

The manual picking portion of an order involving the use of a robotic cart may occur before or after the automated pick cell loading of the tote or totes corresponding to the order with the items available at the automated pick cell. In some embodiments the loading of the tote or totes for an order by the automated pick cell occurs prior to the human picking of items for an order.

The combination of an automated pick cell with robotic carts to satisfy orders offers a number of advantages over a fully automated or fully human pick approach both in terms of hardware costs, flexibility and reliability in terms of the accuracy and completeness of picks for an order.

Consider for example that in various embodiments orders are first processed by the automated pick cell. In such cases rather than completely filling a tote the automated cell may be configured to limit filling of totes to a predetermined portion of a tote's maximum capacity, with the predetermined portion being selected to leave some space in the totes loaded by the automated pick cell. While the unused space in the totes may seem like a waste of capacity, it reduces the risk that items will fall out of the tote as it is loaded by the automated pick cell and/or moved around. In such embodiments the unused capacity of the tote is left available to a human picker for use in loading additional items corresponding to an order.

By distributing the task of satisfying an order between the combination of an automated pick cell and a robotic cart numerous efficiencies can be achieved. The pick cell can be, and sometimes is, supplied with empty totes that are loaded by the automated pick cell, temporally held in some cases in a buffer area, and then automatically loaded onto robotic carts for order completion. The buffering, e.g., temporary storage of totes corresponding to partially completed orders, allows for efficient use of robotic carts and the time of humans working with the robotic carts. It can also reduce the risk of human injury associated with loading totes onto the robotic carts.

In some embodiments, the totes are preloaded by the automated pick cell with items corresponding to an order and are available and waiting for automated loading onto a robotic cart for order completion so that the human operators associated with the robotic carts can have their time used efficiently. In addition, since placement of the tote on the cart can be, and in some embodiments is, automated, the human work normally associated with placing a tote on a cart can be avoided.

In various embodiments empty totes are supplied to a tote input of the automated pick cell and partially filled totes exit the automated pick cell. The partially filled totes in some embodiments are stored in a buffer area before being loaded, e.g., automatically located, onto a robotic cart for order completion. The partially filled totes can be pushed, slid and/or lifted onto the automated pick cart in various embodiments. In some embodiments multi-level pick carts are used with partially filed totes being slid onto different shelves of a multi-level pick cart which then leads a human picker around a portion of a warehouse and guides the human picker in the selection and placement of items into totes to complete one or more orders.

In other embodiments the pick cell uses a robotic arm or other type of actuator to pick items for an order and place them in a storage receptacle such as a container or bin with a discharge chute or slide. A mobile cart is automatically controlled to position itself under the chute or slide and the storage receptacle is controlled to automatically discharge the times picked for an order onto the robotic cart to be used to pick the remaining items for an order or onto which other items for the order have already been picked. In some embodiments the amount of items placed in the receptacle and discharged onto a robotic cart is often limited to less than the full capacity of a tote on the cart into which the picked items are discharged. This reduced the risk of items bouncing and falling out of the cart while still leaving room in a tote for additional items corresponding to the same order to which the picked and discharged items correspond.

Notably the area in which humans pick items can be segregated from the area in an automated pick cell where robotic pick arms or other automated loading devices are used to partially load one or more totes. This provides an increased level of human safety as compared to warehouses where robotic arms or other automated loading equipment operate in the same area. The automated pick cell can and sometimes does have compartments, e.g., bins or other storage locations, which can be stocked and restocked with items without the need for a human to enter the automated pick area of the automated pick cell. In this way human and automated pick operation can be separated and compartmentalized for a level of efficiency and safety that may not be possible when human picking and automated picking are going on in the same area.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are described in the detailed description which follows.

BRIEF DESCRIPTION OF THE FIGURES

FIG. 3 comprises the combination of FIG. 3A, FIG. 3B, FIG. 3C and FIG. 3D.

DETAILED DESCRIPTION

Figure 1:
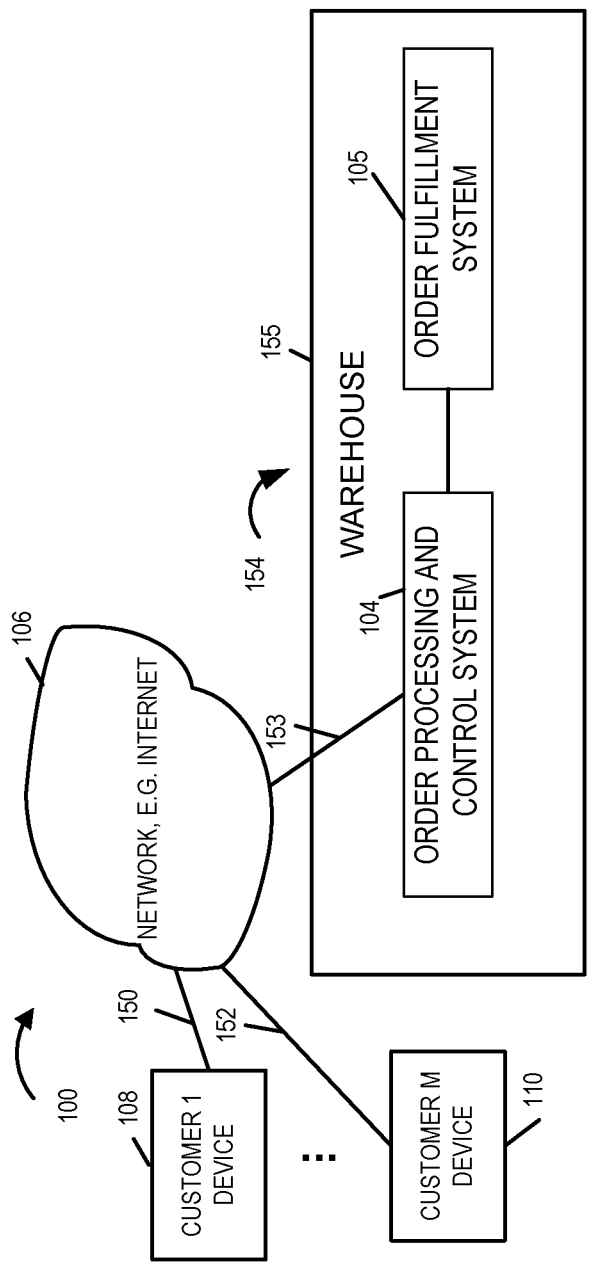
FIG. 1 illustrates a system including a warehouse with order processing and fulfillment implemented in accordance with one exemplary embodiment of the invention.

FIG. 1 illustrates a system 100 including a warehouse system 154 which supports order processing and fulfillment in accordance with one exemplary embodiment of the invention. The warehouse system 154 is in a warehouse represented by the box which is labeled 155. The warehouse system 154 includes in some embodiments the warehouse 155 and the components included therein including an order processing and control system 104 and order fulfillment system 105. While the warehouse system may include the physical warehouse 155 it may include just some or all of the components in the warehouse depending on the embodiment and the term warehouse system should not be interpreted as requiring the physical warehouse to be part of the warehouse system. The warehouse 154 and components included therein, such as order processing and control system 104 and order fulfillment system 105, are sometimes referred to generally as a warehouse system.

In the system 100, customers using any of multiple customer devices, represented by device 1 108 to device M 110 can place orders for items stored at the warehouse 154. The orders include items which are to be collected and shipped to the customer placing the order. The customer devices 108, 110 are, in some embodiments, cell phones or other user devices with connectivity to a communications network 106, e.g., the Internet, via wired or wireless links 150, 152 and via the communications network 106 to the order processing and control system 104. As with the links 150, 152, the link 153 between the order processing and control system 104 and the communications network 106 may be a wired or wireless link. While the order processing and control system 104 is shown inside the warehouse in FIG. 1 it should be appreciated that it can and in some embodiments is, located external to the warehouse, e.g., as part of a cloud based control system.

Orders, e.g., customer orders for items stored at the warehouse, are communicated to the order processing and control system 104, processed and then sent off to the order fulfillment system 105 which is responsible for the actual picking of items, e.g., collection of items from storage locations in the warehouse 154, for one or more orders. The order fulfillment system 105 in some embodiments works under the direction of the order processing and control system 104 which in some embodiments determines what items are to be auto picked and what items are to be manually picked, the number of receptacles to be used for the order picking operation and, in at least some embodiments, whether, for a given order, items are to be auto picked first or manually picked first.

Figure 2A:
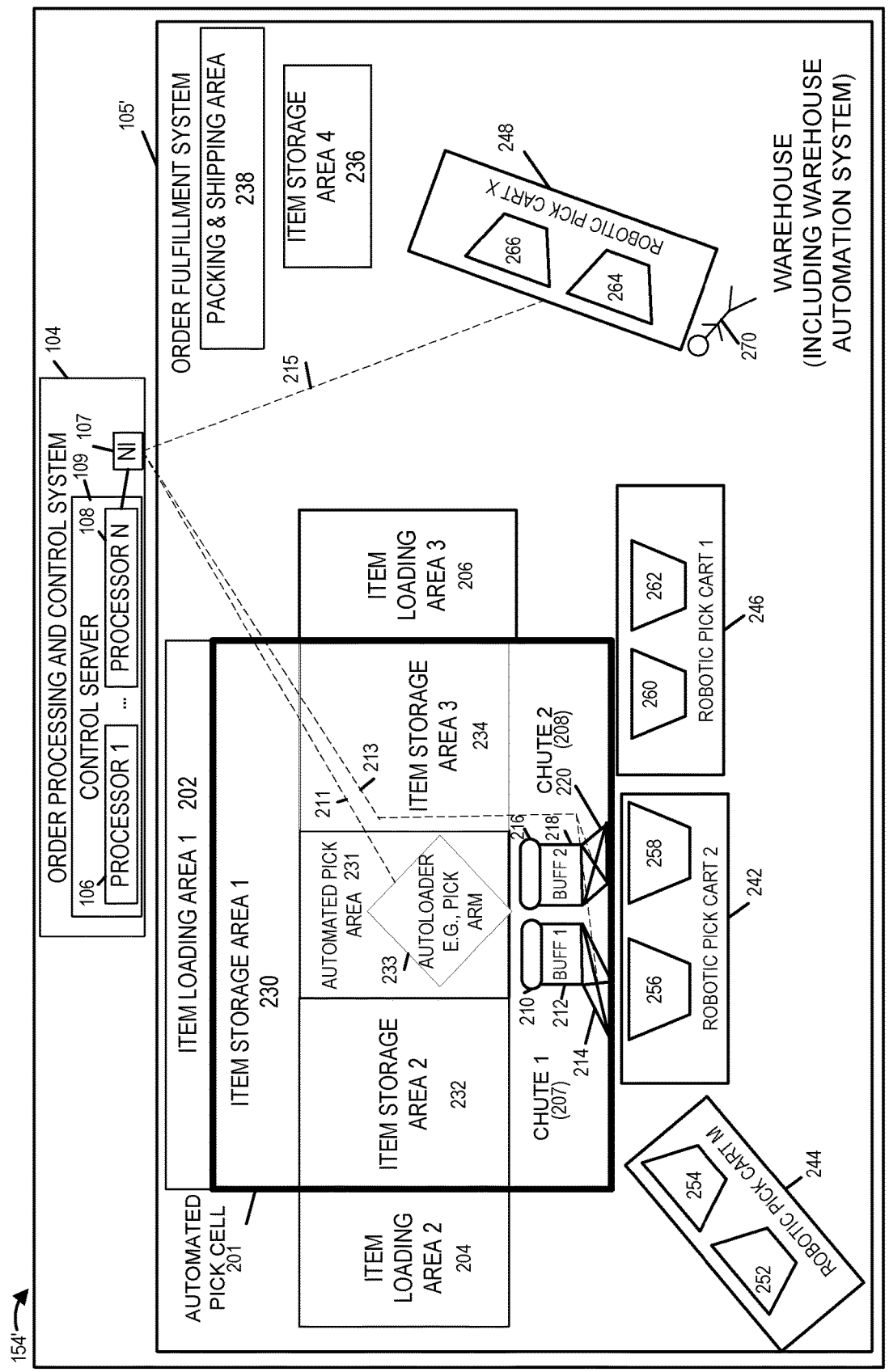
FIG. 2A show an exemplary warehouse system that can be used in the system of FIG. 1.
Figure 2B:
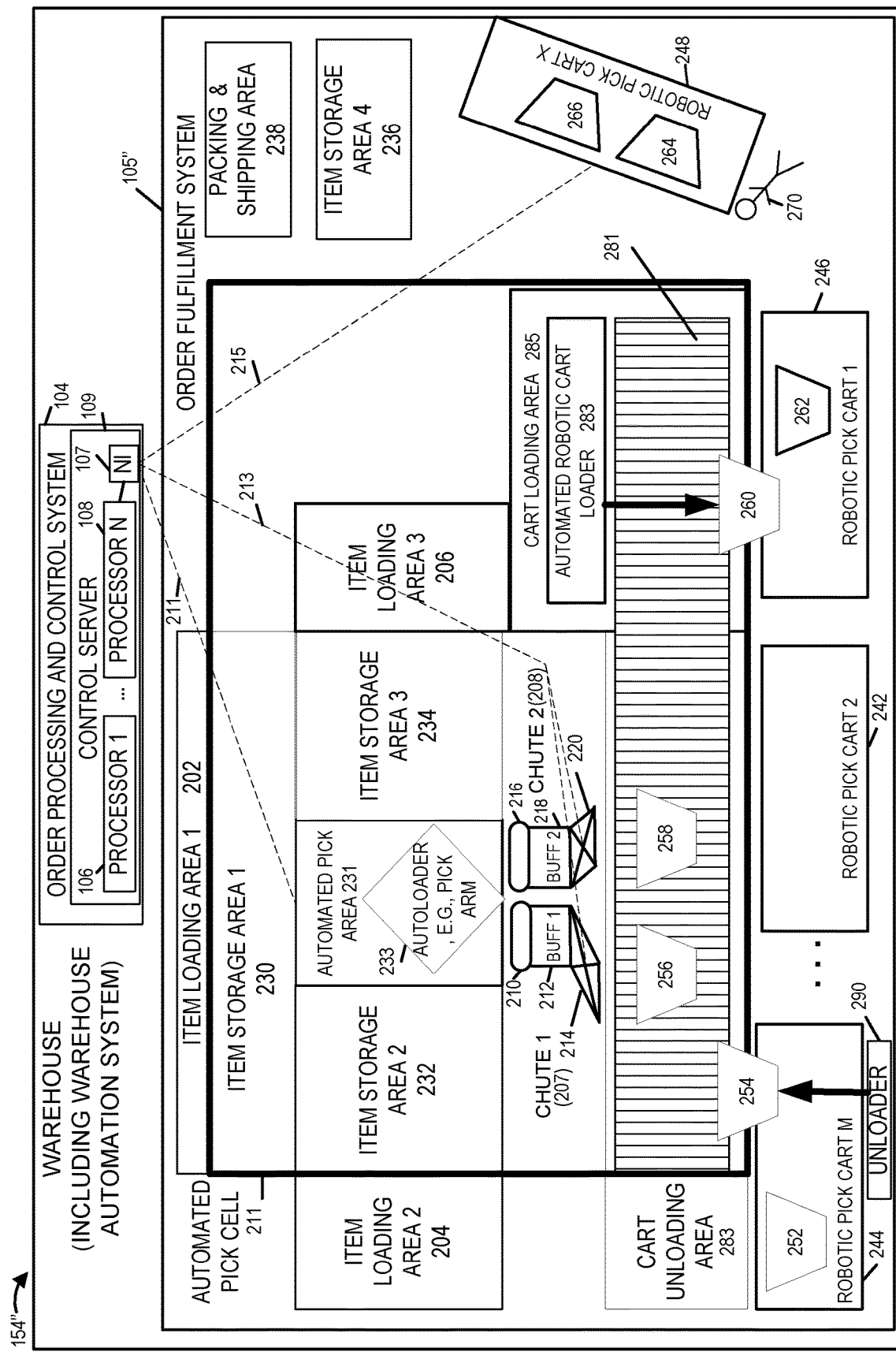
FIG. 2B show another exemplary warehouse system that can be used in the system of FIG. 1.

FIG. 2A shows an exemplary warehouse system 154' which can be used as the warehouse system 154 of FIG. 1. The order fulfillment system 105' can be used as the order fulfillment system 105 of the system shown in FIG. 1. The order fulfillment system 105' includes an automated pick cell 201, various item storage locations 230, 232, 234, 236, a packing and shipping area 238, robotic carts 244, 242, 246, 248 and one or more human workers 270 who work with the robotic carts to perform pick operations, e.g., picking items from item storage area 4 236. Receptacles, e.g., totes, 252, 254 are shown to be currently on robotic cart M 244. Receptacles, e.g., totes, 256, 258 are shown to be currently on robotic cart 2 242. Receptacles, e.g., totes, 260, 262 are shown to be currently on robotic cart 1 246. Receptacles, e.g., totes, 260, 262 are shown to be currently on robotic cart X 248. Item loading area 202 is positioned outside item storage area 1 while item loading area 2 204 is located outside item storage area 2 232 and item loading area 3 206 is located outside item storage area 3 234. From the item loading areas, the storage areas can be safely loaded with items without a human having to enter the automated pick area and risk being contacted by the autoloader 233. The autoloader 233 is an actuator in the form of a robotic arm, storage chute to throwing system or another type of automatic loading device which can remove items from one or more of the nearby storage locations 230, 232, 234 under control of one or more processors 106, 108 of the order processing and control system 104 and place them into the openings of one or more chutes for loading into receptacles either directly while on a robotic pick cart or while passing on a conveyer or belt such as shown in FIG. 2B.

The order processing and control system 104 receives orders via network interface NI 107 but also communicates control information to various components such as the autoloader 233, robotic pick carts 244, 242, 246, 248 and the gate 214 of the first chute 1 207 and the gate 220 of the second chute 2 208. Dashed lines 211, 213 and 215 represent communications links between network interface 107 of the order processing control system 104 and the device to which the dashed line is connected. The communications links 211, 213, 215 can be wired or wireless links and are used to provide control signals and instructions to the various devices and to receive information back from the devices.

In the FIG. 2A example robotic carts which are empty or partially loaded due to a manual prepick are directed towards the chutes 1 and 2 (207, 208). In the example cart M 244 with receptacles 252, 254 is entering the robotic cart line for loading. Robotic pick cart 2 242 is positioned under chutes 1 and 2 (207, 208) with the receptacles 256, 258 positioned for loading. When the autopicking of items for the orders to which receptacles 256, 258 correspond, assuming they correspond to two different orders, one or the processors 106, 108 in the control server 109 will send a signal to the gates 214, 220 to open and drop the items which were automatically loaded into buffers 212, 218 into the corresponding receptacle 256 or 258. The robotic cart will them move forward and either off to the packing and shipping area 238 if the manual pick occurred first or to additional item storage areas with a human picker 270 if the manual pick portion of an order is to be performed after the autopick portion of the order.

It should be appreciated that robotic carts can be queued in the autopick cart line with the human picker being assigned after the autopicked items are loaded onto the robotic cart, e.g., directly or by moving a loaded receptacle onto a robotic cart. In this way human picker time can be efficiently used with human pickers being assigned to carts as needed for the manual pick portion of order processing and the cart being automatically guided without the human operator present by the control server 109 and the processor in the robotic cart during the autopick loading portion of order fulfillment. In this way human picker time is efficiently used, with the human picker meeting with a robotic cart and being guided by the cart for the human picking portion of order fulfillment but with cart moving automatically under processor control at other times without a human.

Notably the autopick cell configuration allows item reloading of the storage areas 230, 232 and 234 without a human having to enter the automated pick area 231 and, in fact, no human need enter the automated pick area 231 allowing for safe and continuous autopicking absent machine breakdowns leading for a safe and efficient use of automated picking apparatus.

In the FIG. 2A example chute 1 207 includes an opening 210, container area 212 which acts as a storage buffer and controllable gate 212 or door which can be opened to drop the items stored in the buffer 212 into a receptacle, e.g., tote. In the FIG. 2A example receptacle 256 on robotic cart 242 is shown positioned under gate 212 so that items located by the autoloader 233 into buffer 1 212 can be dispensed by opening of the gate 214 when the receptacle 256 is positioned beneath the gate 214 of chute 1 207, e.g., while on robotic pick cart 242. Similarly receptacle 258 on robotic cart 242 is shown positioned under gate 220 of chute 2 208 so that items located by the autoloader 233 into buffer 2 218 can be dispensed by opening of the gate 220 when the receptacle 258 is positioned beneath the gate 220 of chute 2 208. While chutes 1 and 2 (207, 208) are shown positioned side by side in some embodiments chute 1 207 is positioned above chute 2 208 so that items can be dispensed to receptacles on upper and lower shelves of a multi-shelf pick cart 242. In such a case one or more separate receptacles 256, 258 are placed on different shelves of the robotic cart with dispensing being from above the shelf and with the items being dispensed from the side being dropped into the receptacle on the lower shelf by the chute extending over the lower receptacle through an open side of the cart 242.

Once loaded with both the items to be autopicked and manually picked the robotic cart, is directed by the control server 109 to proceed to the packing and shipping area 238 where the items corresponding to one or more orders are off loaded, packed and shipped.

FIG. 2B shows an exemplary warehouse system 154" which can be used as the warehouse system 154 of FIG. 1. The order fulfillment system 105" can be used as the order fulfillment system 105 of the system shown in FIG. 1. FIG. 2B shows a system 154" which is similar to the warehouse system 154' of FIG. 2A but in which receptacles are off-loaded from robotic carts and then loaded before being returned to the same or different robotic cart. In FIG. 2B elements which are the same or similar to those of the FIG. 2A embodiment are identified with the same reference numbers and will not be described again for the sake of brevity.

In the FIG. 2B embodiment, robotic pick carts 244, 242, 246, 248 from a line which extends parallel to conveyer belt 281. Empty or preloaded receptacles, e.g., totes, are removed from the robotic cart at the unloading area 283 with the unloader 290 transferring, e.g., pushing the receptacle, onto convey belt 281. Receptacle 254 is shown being automatically placed, e.g., on the conveyer belt 381 by the unloader 290 pushing the receptacle 254 onto the belt as represented by the arrow shown extending in the direction of the belt. The receptacle moves along the conveyer 281 towards chutes 1 and 2 (207, 208) where the receptacle can be loaded with items which were picked by the autoloader 233. In the FIG. 2B example receptacles 256 and 258 are shown beneath chutes 1 and 2 (207, 208), respectively. In this position the control server 109 will trigger the release by gates 214, 220 into the receptacles 256, 258 respectively. Once loaded with the autopicked items, the loaded receptacles are conveyed towards the cart unloading area 285 where the automated robotic cart loader 283 transfers the loaded receptacles onto the robotic pick cart. In the FIG. 2B example robotic pick cart 1 246 can be seen being loaded with the receptacle 260 being pushed onto the pick cart by autoloader 283 as represented by the arrow point toward the robotic cart 246. Once the receptacles with the autopicked items are loaded onto a cart the cart is controlled to travel to the packing and shipping area 238 if the manual pick occurred first or a human picker 270 is assigned to the cart and the picker 270 is guided to by the robotic cart to manually pick any items needed to complete an order or orders.

As discussed the system 100 implements order fulfillment operations under the control of an order processing and control device, e.g., the order processing and control system 104 shown in FIG. 1, which coordinates operations of an automated pick cell and use of mobile robotic carts. The automated pick cell 231 includes a robotic arm 233 or other device with the ability to transfer individual items from storage locations in the area of the automated pick cell into receptacles, e.g., totes which are also sometimes referred to as storage containers, which can, and sometimes are, then automatically loaded onto a mobile robotic cart 244, 242, 246, or 248 so that picking for one or more orders can be completed, e.g., manually by a human, guided by the mobile robotic cart so that the order or orders can be completed if the manual pick portion of the order was not completed prior to the loading of receptacles with autopicked items. In various embodiments the system 100 includes one or more robot pick carts 244, 242, 246, 248 and one or more automated pick cells 201 or 211 with the number of carts and pick cells depending on the particular embodiment and the balance between automated picking and manual picking that is to be used. Robotic devices including the robotic arm 233 and/or robotic carts 244, 242, 246, 248 are controlled to work collaboratively with people in the warehouse, e.g., warehouse building in which the order fulfillment system and/or order processing system 104 are located such that the system can dynamically assign a robotic cart and person 270 to work together for some time, and then at an appropriate time have the robotic cart work with another person.

The automated pick cell's fulfillment operations are automated under the control of an order processing and control system 104 such that the automatic pick cell 201 or 211 will select items as instructed by the control system 104 from one or more storage locations, and then transfer the item or items to a receptacle, e.g., tote, that is then loaded either manually or automatically onto a mobile robotic pick cart such as shown in the FIG. 2B embodiment. In other embodiments, such as the FIG. 2A embodiment, the autopicked items are transferred directly to a receptacle which is on a robotic cart. The automated pick cell 201 or 211 may be, and sometimes is, constructed so that the automatic pick cell 201 or 211 can build one or more collections of items, e.g., a set of items corresponding to an order, in a transfer system, e.g., chute assembly corresponding to chute 1 207 including opening 210, buffer storage container 212 and gate or door 214. The transfer system may convey totes, e.g., one or more of receptacles 252, 254, 256, 258, 260, 262, 264, and/or 266 into which the items corresponding to an order are loaded prior to loading of the totes and items on to a mobile cart. Alternatively the items corresponding to an order can be placed in a storage container, e.g., buffer 212 or 218 and the discharged onto the mobile pick cart, e.g., by dropping the items into a tote on the mobile cart as shown in FIG. 2A. The dropping of items onto a mobile robotic cart may, and sometimes does, occur as the items are release from the container 212 and/or 218 in the pick cell into which they were placed allowing the items corresponding to an order to fall onto the robotic cart, e.g., into a tote 256 or 258 on the robotic cart 242, all at once. It's also possible that the automated pick cell 201 or 211 can select multiple items from one or more storage locations simultaneously.

Item selection could be done via devices such as robotic arms, X/Y/Z gantry and crane systems, tilt-shift sortation systems, diverting conveyor systems, among other solutions. Accordingly the autoloader 233 can be, and sometimes is, implemented using one, more or all of such devices. Items may be stored in totes, shelves, an Automated Storage & Retrieval System (AS/RS) as is common in the warehouse industry, along with other systems prior to discharge or loading onto a mobile cart. Such item storage may be, and sometimes is, in one or more of item storage areas 230, 232, 234.

Once collected, items can be, and sometimes are, placed directly onto storage locations on the mobile robotic cart, e.g., into totes 256, 258 on the mobile cart 242 or the items are placed into a "passive" transfer mechanism such as a chute or slide to immediately move the item onto the robot cart, or stored in a buffering device so that the automated pick cell can select multiple items prior to the robotic cart's arrival.

When an empty robotic cart has arrived at the loading station, e.g., is positioned under chutes 1 and 2 (207, 208), in some embodiments it sends a signal to the loading system, e.g., of the automated pick cell or buffer system, and the items that were picked for an order are released from the automated pick cell or buffering system onto the robot pick cart. A processor 106 or 108 in the control server 109 is the device in the loading system which receives the signal from the robotic pick cart in some embodiments and triggers the release of items into the totes in other embodiments a separate processor in the automated pick cell which acts as a loader control associated with the chutes receives the signal indicating that the mobile cart 242 is in position for loading and triggers the release of items onto the cart 242.

In the case where items are located, e.g., loaded, into totes in the automated pick cell as in the case of the FIG. 2B embodiment, the tote may be moved onto the pick cart by the loader 283. In cases where a storage container, e.g., buffer 212 or 218 of chute system 1 or chute system 2, is used to store the picked items for an order controlling a chute door 214, 220 or other mechanism to be released allowing the items to drop onto the cart, e.g., into a tote on the mobile robotic cart. The server 109 may and in some embodiments does send the chute release signal to the gates 214, 220 when the totes 256, 258 are in position for loading and then a signal to the loader control to move the loaded tote onto a cart when an empty robotic cart is in position for loading.

As an alternative to picked items being directly dropped onto a mobile robotic cart by the automated pick cell or buffer system as shown in FIG. 2A, in some embodiments, totes are manually or automatically removed from mobile robotic carts, loaded into the automatic pick cell, loaded and then automatically placed on an empty cart as shown in FIG. 2B. Thus, in some embodiments, the system automatically unloads receptacles from the mobile robotic cart and loads another set of totes onto the mobile robotic cart, allowing the empty cart to leave quickly. The cell can then transfer items into the totes and then transfer the unloaded totes back onto another robotic cart. The set of totes loaded and unloaded onto the robotic carts do not need to remain together. For example, two totes could be removed from one robotic cart, and two removed from a second robotic cart. Then the first tote of each set could be loaded onto a third robot cart and the second tote from each set could be loaded onto a fourth robotic cart.

Replenishment of items into the automated pick cell 201 or 211 can be done in multiple ways, either manually or via automation. Individual receptacles can be manually loaded with inventory, or receptacles could be ejected from the storage mechanism onto conveyor or mobile robotic carts and transported elsewhere for restocking and returned. In the meantime, full receptacles can be loaded into the vacant locations in the cell.

FIG. 3, which comprises the combination of FIG. 3A, FIG. 3B, FIG. 3C and FIG. 3D, shows the steps of a method 300 implemented in accordance with the invention.

The method starts in start step 302 with the order processing and control system 104, automated pick cell 101 and/or 111 and robotic carts 244, 242, 246, 248 being powered on and prepared for operation. Operation proceeds from start step 302 to step 304, in which an order is received at the order processing and control system 104, the order being a first order including a list of items.

Operation proceeds from step 304 to step 306 in which the control server 109 determines a first set of order items in the first order to be autopicked, e.g., by an auto pick cell 201 or 211 and a second set of items in the first order to be manually picked. Thus in step 306 the order processing system divides items corresponding to an order into those which are to be autopicked and those which are to be manually picked.

Operation proceeds from step 306 to step 308 in which the order processing system 104 accesses information on the size, shape and/or weight of times in the first set of items, e.g., the items to be autopicked. Then in step 308 the order processing system 104 accesses information on the size, shape and/or the weight of items in the second set of items, e.g., the items to be manually picked.

Operation proceeds from step 310 to step 311 in which the order processing system determines whether a manual or autopick operation is to occur first for the order being processed.

In many cases when automatic loading of a receptacle is implemented by a robotic arm or tossing device, the item being loaded might bounce. Furthermore the dropping of the items can impact other items in the tote. Manually loaded items are placed by a human and are less likely to fall out of a tote during loading. In addition manually loaded items are in many cases not dropped or tossed into a receptacle. To reduce the risk of items falling out of a receptacle for autoloading purposes the capacity of the tote in terms of volume is often considered to be less than the full remaining volume of the tote, e.g., ⅔ of the capacity of the receptacle. In the case of manual loading capacity may be based on the full volume capacity of the receptacle or some portion which is greater than that used for autoloading computation purposes, e.g., 90% of the tote capacity. Taking into consideration the size and shape of items, and/or the weight of items, depending on the items to be autopicked and manually picked, the order of picking may affect the number of totes required. In many but not all cases loading of autopicked items prior to loading of manually picked items can result in the use of fewer receptacles to hold the items corresponding to an order. However this may not always be the case depending on the shape and size of the items in the order. In some embodiments in step 311 the decision is to perform autopick prior to manual picking when it will result in the use of fewer receptacles than performing manual picking first. Thus there is a preference for selecting the picking order which will result in the lowest number of totes being used.

While there is a preference for the pick order that will result in the lowest number of receptacles to hold the items in an order, this preference is superseded by weight considerations in some embodiments. If items which are to be autopicked or manually picked are heavy, e.g., have an item weight above a first weight threshold, and may damage other items if they are placed on top of other items, the pick order will be selected so that items above the first weight threshold are loaded before items below the first weight threshold. Accordingly if items above the first weight threshold are to be autopicked, in at least some embodiments the autopick operation will be selected to precede the manual pick operation for the order. However if in an order the items to be manually picked exceed the first weight threshold the decision will be to perform the manual pick first. In this way the risk of placing heavy items on top of other items is reduced even though in some cases it will result in more receptacles, e.g., totes, being used than if a different pick order was selected.

Thus in step 311, in some embodiments the autopick or manual pick order is first selected to minimize the risk of damage but in cases where both orders result in little risk of damage or the same potential risk of damage to items by loading, the pick order, e.g., autopick or manual pick first, which results in the smallest number of receptacles, e.g., totes, being used to hold the items in an order is selected.

With the pick order having been determined in step 311 operation proceeds to step 312 where the determined pick order is taken into consideration in determining how to proceed. If in step 312 it is determined that the autopicking is to precede manual picking operation proceeds from step 312 to step 314; otherwise, operation proceeds to from step 312, via connecting node A 344 to step 346 shown in FIG. 3C. Thus it should be appreciated that step 312 controls the order of the autopick of said first set of items and manual pick of items by the human picker based on the determined order of the autopick operation and the manual pick operation.

In some embodiments the decision made in step 311 is made based on the information accessed in steps 308 and 310. In some cases the order in which the autopick and manual pick operations occur will involve the use of different numbers of totes, e.g., due to the loading limitations of the autopicker. In at least some embodiments the picking order is selected based on the order which will require the lower number of receptacles, e.g., totes, to hold the items for the order. In other embodiments item weight is taken into consideration. In one such embodiment when items above a certain weight, e.g., heavy items, are included in an order, the pick order is determined so that the heavy items are loaded first. In such a case if the heavy items are to be autopicked the autopick will proceed first, but if the heavy items are to be manually picked the manual pick will be determined in step 311 to proceed the autopick. The selection of auto or manual pick order based on item weight so that heavy items are loaded first reduces the risk of heavy items crushing lighter or more fragile items.

With the pick order having been determined in step 311 operation proceeds to step 312 where the determined pick order is taken into consideration in determining how to proceed. If in step 312 it is determined that the autopicking is to precede manual picking operation proceeds from step 312 to step 314; otherwise, operation proceeds from step 312, via connecting node A 344, to step 346, shown in FIG. 3C.

In step 314 the control server access information indicating the capacity of receptacles for autopick loading prior to manual pick loading. In at least some embodiments a single uniform size receptacle is used for both autopicked and manual picked items with the receptacle capacity, in terms of size, shape, volume and weight carrying capacity being known. In other embodiments multiple different size receptacles are available for use with the size, shape, volume and weight capacity of each of the available receptacle types being known.

By the time step 314 is reached it has been determined that the autopick operation is to precede the manual pick operation. In step 314 the control server accesses information indicating the capacity of receptacles for autopick loading prior to manual pick loading. As noted above for autopick purposes the receptacle capacity may be, and often is, treated as less than the full available capacity of a receptacle, e.g., ⅔ of the available volume of the receptacle, to reduce the risk that loading will result in items bounce or falling out of the receptacle during loading.

Operation proceeds from step 314 to step 316. In step 316 a first number of receptacles to be used to satisfy the autopick portion of an order, e.g., the number of receptacles to be used to hold the first set of items corresponding to the order is determined. The number of receptacles is determined in some embodiments based on the volume available in the receptacles, the weight carrying capacity of the receptacle and the size, shape and weight of the items in the first set of items. With the number of receptacles to be used to satisfy the autopick portion of the order having been determined in step 316, operation proceeds to step 318 where the order processing and control system 104 assigns the determined first number of receptacles for autopick loading to the order so that they can be automatically loaded.

In step 320 the order processing system 104 determines if the unused capacity of receptacles, e.g., the determined first number of receptacles allocated in step 318 for the autopick portion of the order, is sufficient to hold the items in the second set of items, e.g., the items in the portion of the order that is to be manually picked. If in step 320 it is determined that the unused capacity in the first number of receptacles is sufficient for the items of the order that are to be manually picked, operation proceeds from step 320 to step 328 via connecting node B 326. However if in step 320 it is determined that the unused capacity of the first number of receptacles allocated for autoloading is insufficient to hold the items of the order that are to be manually picked operation proceeds from step 320 to step 322.

In step 322 the number of additional receptacles to be allocated for the manual pick portion of the first order is determined. These receptacles will be used to hold items from the manual pick portion of the order which can not fit in the receptacles, e.g., the first number of receptacles, assigned for autoloading.

In step 324 the additional receptacles which are to be used for the manual pick portion of an order, e.g., in addition to one or more receptacles which have autoloaded items, are allocated to the first order by the order processing system 104. Operation proceeds from step 324 to step 328 of FIG. 3B via connecting node B 326.

In step 328 one or more robotic carts are assigned to the order being processed. Then in step 330 the autopick cell is controlled to autoload receptacles allocated to the order by preloading receptacles prior to placement on the cart as in the FIG. 2B example or by loading items directly into receptacles on the assigned carts, e.g., as in the FIG. 2A example.

In the case where items are autoloaded into the receptacles before the loaded receptacles are placed on assigned carts, step 330 further includes a cart loading step in which the preloaded receptacle or receptacles are loaded, e.g., moved, onto one or more assigned carts, e.g., by automated cart loader 283 as shown in FIG. 2B.

Operation proceeds from step 330 to step 332 in which a human picker is assigned, e.g., by the order processing system 104, to the loaded robotic cart. Then in step 334 pick instructions are provided, e.g., by the order processing system 104, to the robotic cart to which the human picker was assigned. The pick instructions provide information to the robotic cart which is used to guide the robotic cart around the warehouse automatically to complete the manual pick portion of the order and also to provide guidance to the human operator, e.g., via a display and/or audio output of the robotic cart, as to which items are to be picked as the cart moves around the warehouse to complete the order.

Operation proceeds from step 334 to step 336 in which the robotic cart provides, via its human interface including a display and speakers, instructions to the human picker 270 as to which items to pick and/or into which receptacle on the cart a picked item is to be placed, as the robotic cart guides, e.g., leads, the human operator around the warehouse to manually pick items for the order. Then, after completion of the manual pick portion of the order, in step 338 the order processing system and/or a processor on the robotic cart guides the robotic cart to the packing and shipping area. Thus by the time the robotic cart reaches the packing and shipping area both the automatic and manual pick operations used to load the receptacles corresponding to the order on the cart will have been completed.

In step 340 the loaded receptacles are automatically or manually offloaded in the packing and shipping area where the receptacles are emptied, packaged and then shipped.

Operation proceeds from step 340 to step 304 via connecting node 342 where the system processes another order. This is to show that order processing can be performed on an ongoing basis with the emptied receptacles and robotic carts being reused to process another order once they are done being used for a different order.

Figure 3A:
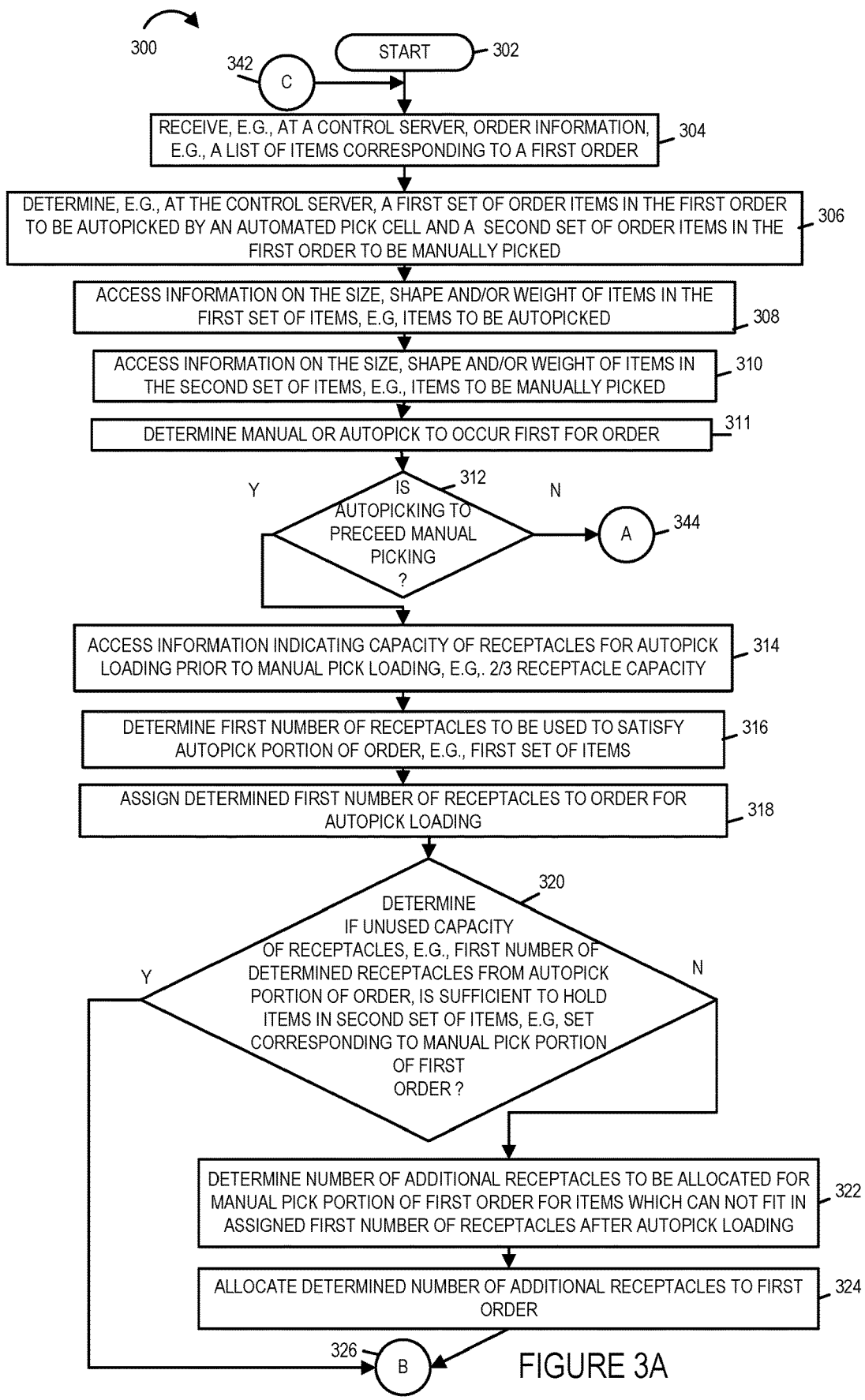
FIG. 3A is a first part of a flowchart of an exemplary method implemented in accordance with the invention.
Figure 3B:
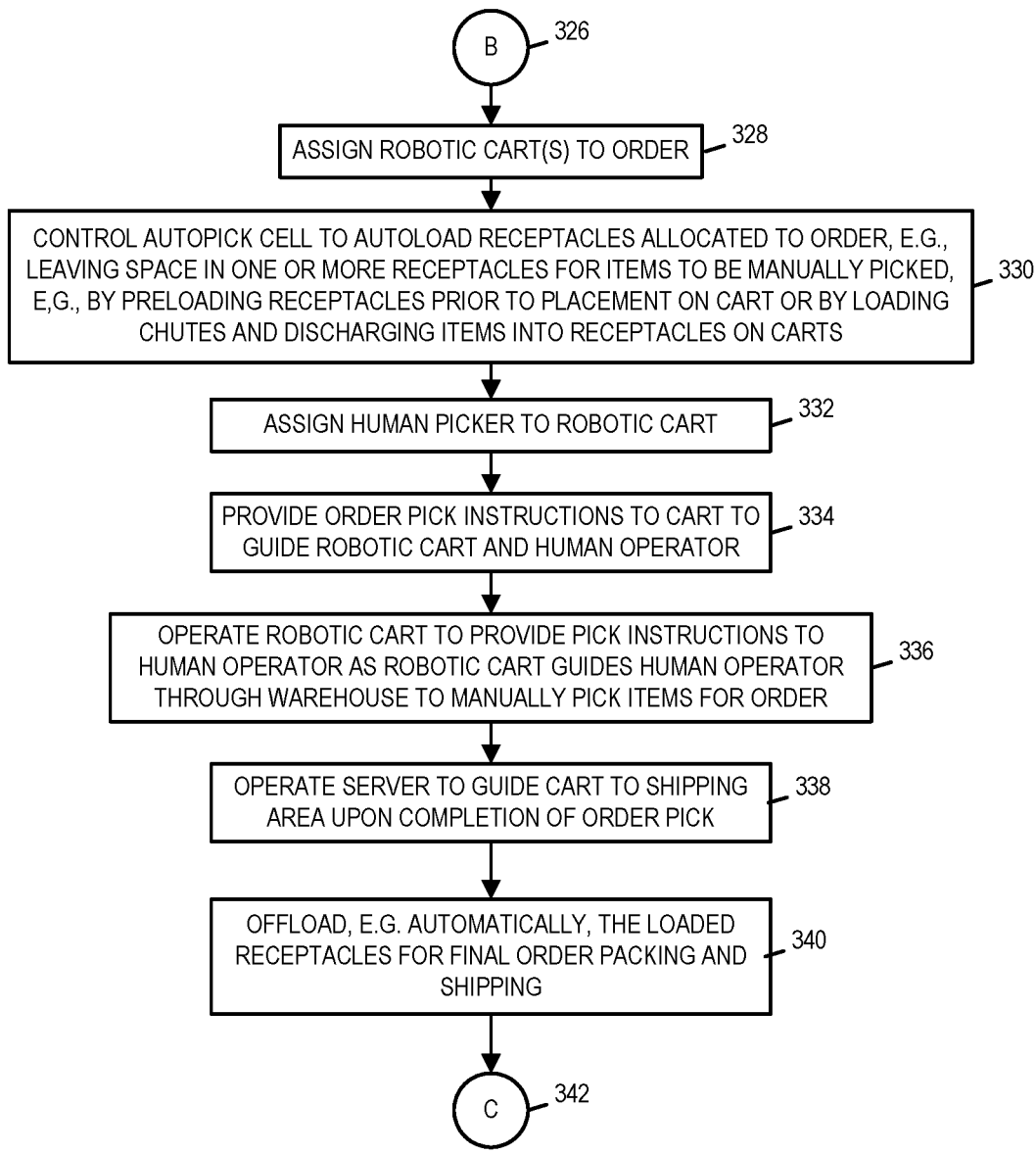
FIG. 3B is a second part of a flowchart of an exemplary method implemented in accordance with the invention.
Figure 3C:
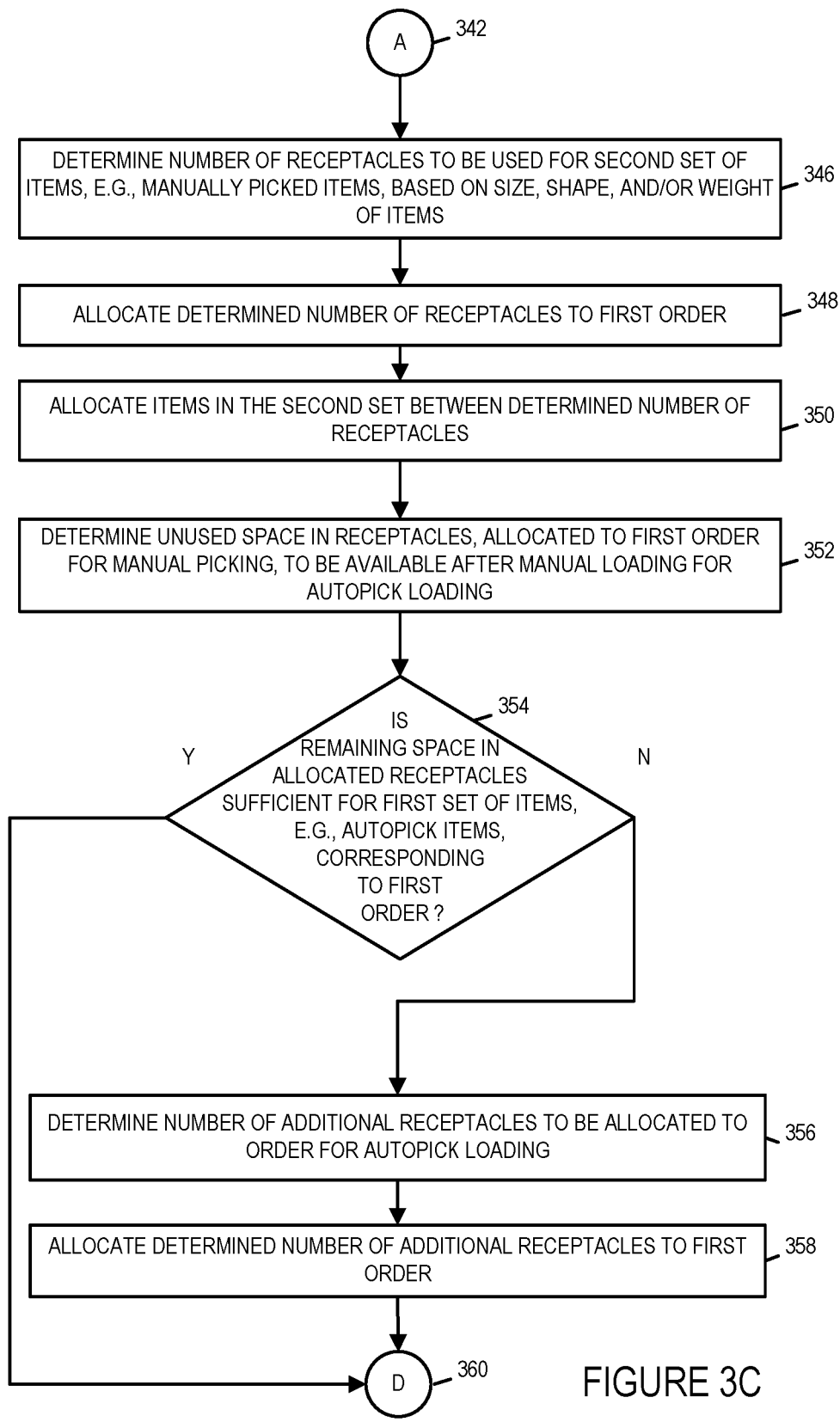
FIG. 3C is a third part of a flowchart of an exemplary method implemented in accordance with the invention.
Figure 3D:
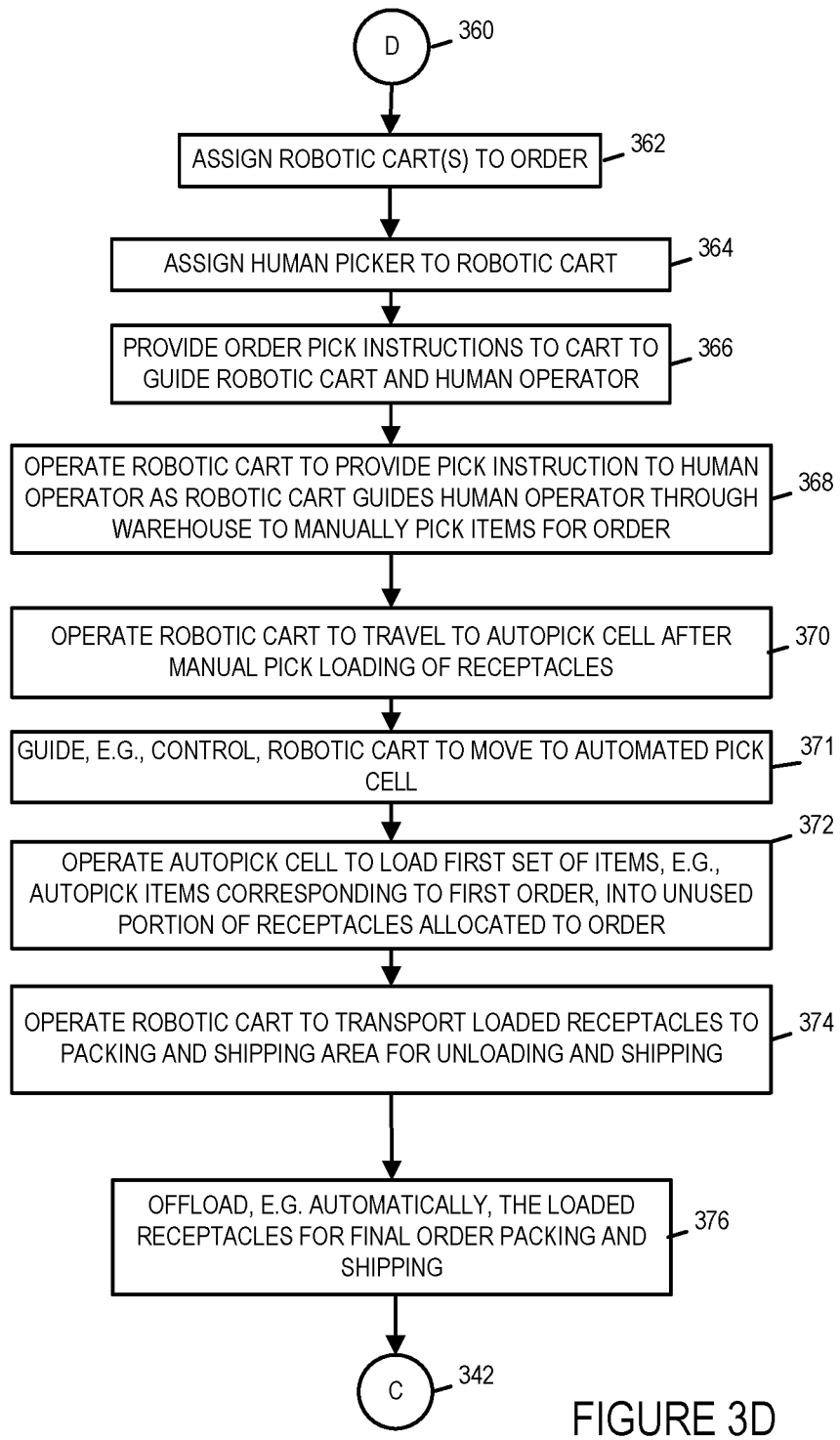
FIG. 3D is a fourth part of a flowchart of an exemplary method implemented in accordance with the invention.

Referring once again to FIG. 3A, if in step 312 it was determined that manual picking was to precede autopicking of items for an order, operation proceeds from step 312 to step 346 shown in FIG. 3C via connecting node A 344.

In step 346 the number of receptacles to be used for the second set of items, e.g., the items to be manually picked for an order, is determined, e.g., by the order processing system 104, based on the size, shape and/or weight of items. Then in step 348 the number of receptacles determined in step 346 is allocated by the order processing system to the first order, i.e., the order being processed. Operation proceeds from step 348 to step 350 in which items in the second set are allocated, e.g., assigned for placement in receptacles assigned to the first order. Thus by the end of step 350 the number of receptacles to be used for manual picking and what items are to be placed in individual receptacles has been determined. Operation proceeds from step 350 to step 352 in which a check is made to determine the amount of unused space in receptacles allocated to the first order for manual picking will be available for autopick loading. Operation proceeds from step 352 to step 354 in which the order processing system determines whether the remaining space determined in step 352, in the receptacles allocated for manual picking, is sufficient to hold the first set of items, e.g., the items of the order which are to be autopicked. If the remaining space in the allocated receptacles is sufficient for the items to be autopicked operation proceeds to step 363 via connecting node D 360. If the remaining space in the receptacles allocated for manually picked items is not sufficient for the items to be autopicked, e.g., the first set of items of the order, operation proceeds from step 354 to step 356. In step 356 the order processing system 104 determines the number of additional receptacles to be allocated to the order being processed for autopick loading. Operation then proceeds to step 358 wherein the order processing system 104 allocates the additional receptacles to the first order so that they, along with the receptacles used for the manual picked items are available for autoloading to the extent they have unused space. Operation proceeds from step 358 to step 362 of FIG. 3D via connecting node D 360.

In step 362 the order processing system assigns a robotic cart to the order being processed. Then in step 364 a human picker 270 is assigned by the order processing system 104 to the robotic cart. Next in step 366 order pick instructions are loaded into the robotic cart to guide the cart around the warehouse and provide pick instructions to the human operator as the cart automatically moves around the warehouse as part of the manual picking of items for the order. In step 368 the reobotic cart provides audio and/or visual pick instructions to the human operator instructing the human operator as to which item is to be picked and what receptacle on the cart the item is to be placed into. Once the items to be manually picked have been loaded on to the robotic cart, e.g., by the human operator placing the items in receptacles on the cart, the robotic cart is automatically guided in step 371 by the control server 109 and/or the processor on the robotic cart to the automated pick cell 201 or 211 so that the remaining ordered items can be autopicked and loaded into the receptacles corresponding to the order.

Operation proceeds from step 371 to step 372 in which the automated pick cell is controlled, e.g., by the order processing system 104, to load the first set of items, e.g., the items to be autopicked, into unused portions of receptacle or receptacles allocated to the order. The loading may be directly into receptacles on the robotic cart as in the FIG. 2A embodiment or into the receptacles after removal from a cart as in the FIG. 2B embodiment with the receptacles then being placed back on a cart as part of step 372 after loading with the autopicked items. Thus at the end of step 372 the receptacles may, and sometimes do, include both autopicked and manually picked items corresponding to an order. Operation proceeds from step 372 to step 374 wherein the robotic cart with the loaded receptacles is controlled, e.g., by the order processing system or processor on the robotic cart, to transport the loaded receptacles to the packing and shipping area for unloading and shipping of the collected items.

In step 376 the receptacles are offloaded, e.g., automatically, in the packing or shipping area where the ordered times are packaged and shipped. Operation proceeds from step 376, via connecting node C 342, to step 304 so that the items corresponding to another order can be collected, packaged and shipped.

Figure 4:
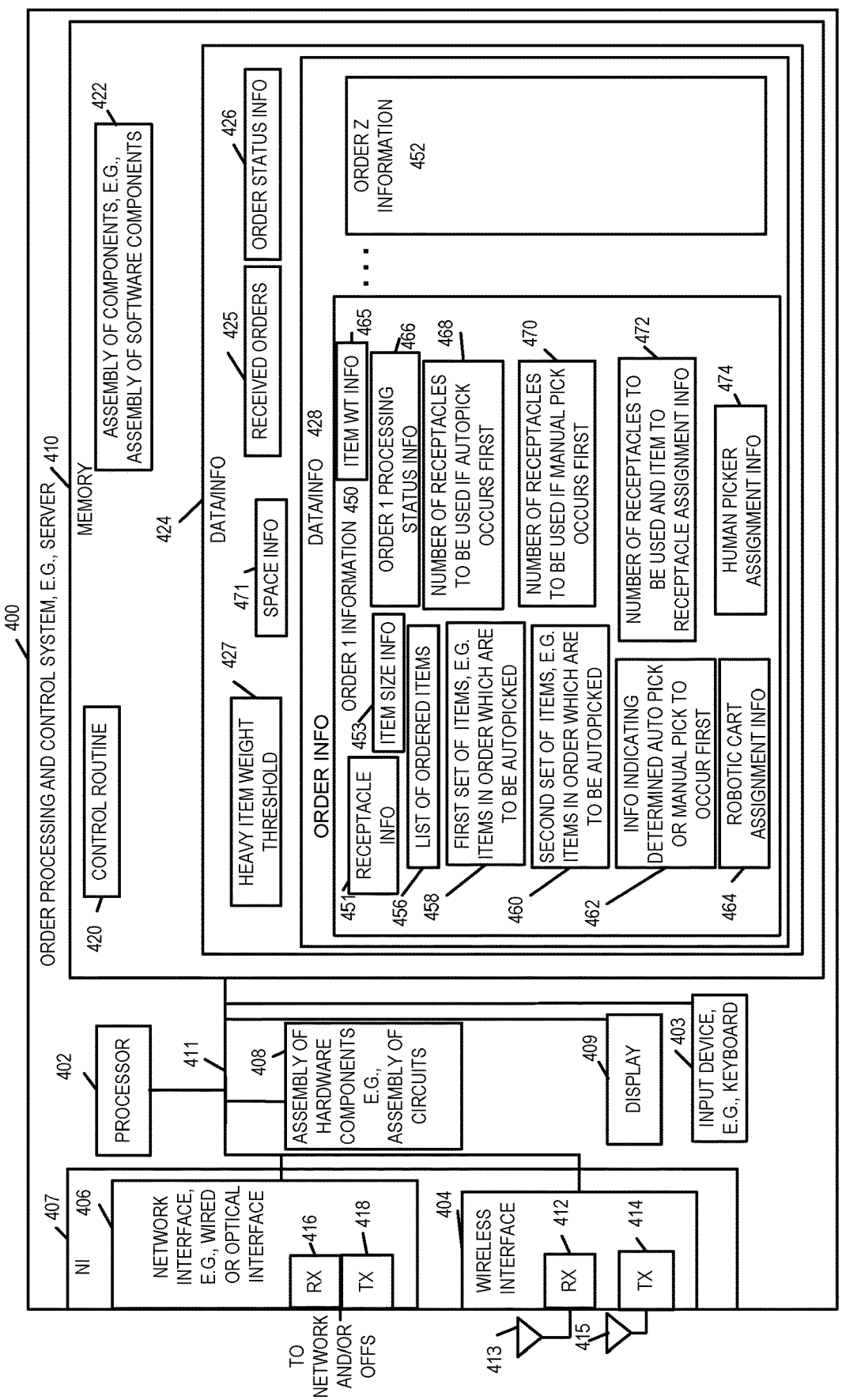
FIG. 4 shows an exemplary order processing system that can be used in the system of FIG. 1 or any of the other figures.

FIG. 4 illustrates an exemplary order processing and control system 500 which can be used as the order processing and control system 104 shown in any of the other figures of this application. The order processing and control system 400 maybe and sometimes is implemented as a sever located in the warehouse where 154 or external to the warehouse, e.g., as a cloud based sever system. The system 400 includes a processor 402, memory 410, network interface 407, display 409, input device 403, e.g., keyboard, and assembly of hardware components 408, e.g., circuits, which are coupled together by bus 411 as shown in FIG. 4. The network interface (NI) 407 includes a wired or optical interface 406 and a wireless interface 404. The wired or optical interface 406 includes a receiver circuit (RX) 416 and a transmitter circuit (TX) 418. The first interface 406 provides wired or optical connectivity to a network such as the Internet and/or components of the Order Fulfillment System (OFS) 105, 105' or 105" such as the autoloader 233, chute gates 214, 220 and/or robotic carts. Wireless interface 404 include a receiver circuit (RX) 412 coupled to receive antenna 413 and a transmitter circuit (TX) 414 coupled to transmit antenna 415. The second interface 404 provides wireless connectivity to a network such as the Internet and/or components of the Order Fulfillment System (OFS) 105, 105' or 105" such as the autoloader 233, chute gates 214, 220 and/or robotic carts. Via network interface 407 the order processing and control system 400 can receive orders from customer devices 108, 110 and receive signals and information from the OFS 105, 105' or 105" and send control signal to the OFS to control the robotic carts, chutes, autoloader 233 and one or more other devices either wirelessly, via wired signals or optical signals. Memory 424 includes item size information (453) indicating the size and/or shape of items in said first order; receptacle information (451) about the size, shape and/or volume of a receptacle or receptacles to be used for the first order (e.g., information determined by the first server about how much the first receptacle can hold) and space information (471) about an amount of space to be left in a first receptacle to be used for the first order for additional items to be placed in first receptacle.

The processor operating under the control of control routine 420 controls the order processing and control system 400 to implement the steps of the method shown in FIG. 3 relating to order processing and control of components in the OFS 105, 105' or 105". The memory 424 includes data and other information 424 relating to the processing of orders and control of the components in the OFS 105, 105' or 105". The data and information 424 included in the memory 410 includes a heavy item weight threshold 427, a set of received orders 425, order status information 426 indicating the current processing and/or shipment status of the orders stored in memory portion 425 and a set of per order information 228 which includes information for each of a plurality of orders being processed and satisfied by one of the order fulfillment systems 105, 105' or 105". The heavy weight item threshold 427 is a weight, above which, there is a risk of damaging other items if an item with a weight above the heavy weight threshold is dropped or placed on top of other items. In some embodiments the heavy weight item threshold is used in determining if an auto pick loading or manual pick should occur first, e.g., to avoid possible damage by placing the heavy item, e.g., an item with a weight above the heavy weight threshold in a receptacle before other items.

The exemplary order information 228 includes information for a plurality of orders, e.g., information 450 for order 1 through information 452 for order Z. The information 450 for order 1 is exemplary of the per order information stored in memory for each order. The order information 450 includes a list 456 of the ordered items, a first list 458 of a first set of items which are items in the order which are to be autopicked and a second list 460 of a second set of items which are to be manually picked. The first set of items 458 is a subset of times in the list of ordered items 456 which are available from the autopick cell 201 or 211 being used. The second set of items 460 are items which are available outside the autopick cell at the warehouse and which are to be manually picked and is a second subset of items from the list of ordered items 456 corresponding to the first order. Information 462 indicates whether autopick or manual pick is to occur first for order 1 and is determined by the processor taking into consideration a number of factors including the weight of one or more items and/or the number of receptacles which will be required if an autopick or a manual pick occurs first for the order. Information 464 includes robotic cart assignment information and indicates one or more robotic carts assigned to transporting receptacles which are to be used to hold items corresponding to an order. Order processing status information 466 indicates the status of the order, e.g., whether manual pick has been completed, whether autopicking of items for the order has been completed and/or whether the order is ready to be sent to the packing and shipping area for final processing before shipment. Because the autopick and manual pick order affects the how space is used in receptacles the number of receptacles may vary depending on the pick order. Information 468 indicates the total number of receptacles to be used if autopick occurs first while information 470 indicates the total number of receptacles to be used if manual pick occurs first. Information 472 indicates the actual number of receptacles to be used for order 1 which depends on the pick order and/or other considerations such as maximum weight per receptacle. Information 472 includes in addition to the number of receptacles to be used the mapping of ordered items to individual receptacles. This information is communicated to one or more robotic carts and is used to control the path of the robotic carts through the warehouse and also to provide guidance to a human picker as to what items should be picked for order 1 and into which receptacle on a cart the picked item or items should be placed. Human picker assignment information 474 indicates which picker or pickers have been assigned to pick items for order 1 while robotic cart assignment information 464 indicates the cart or carts to be used to pick items for order 1. Human pickers are sometimes selected by the processor 403 and assigned to a robotic cart based on the human picker's familiarity of the portion of the warehouse where items are to be picked to complete order 1.

Using the information 424 stored in memory 410, the processor 402 can determine whether manual or automatic picking is to occur first, the number of receptacles to be used and then assign robotic carts and human pickers in an efficient manner allowing for efficient use of both the automatic pick cell's capabilities and the availability of human pickers. The robotic carts assigned to an order can be and sometimes are guided by the processor 403 to automatically travel between the autopick cell and storage locations where manual picking occurs with the human picker being assigned to, and working with the robotic cart, for a portion of the pick processes. In this way valuable human resources can be used efficiently and without risk of injury from the automated pick apparatus 233 which the human picker can avoid which is beneficial from a safety perspective.

Information and commands are communicated in some embodiments wirelessly to the robotic carts form the order processing and control system and the robotic carts signal back their location and order pick status which allows the order processing and control system to update the order status information and warehouse inventory information on a real time basis as items are picked and placed on the robotic cart or carts as part of satisfying an order. In some embodiments restocking of the autopick cell occurs automatically with the processor 403 triggering or controlling restocking as needed based on picking which occurs.

It should be appreciated that the order processing and control system in combination with one or more of the automated pick cells 201, 211 provides for an efficient, safe and cost effective approach to order fulfillment with automated picking being used for high volume items along with manual picking for lower volume item or items which are not easily loaded by an autoloader.

Figure 5:
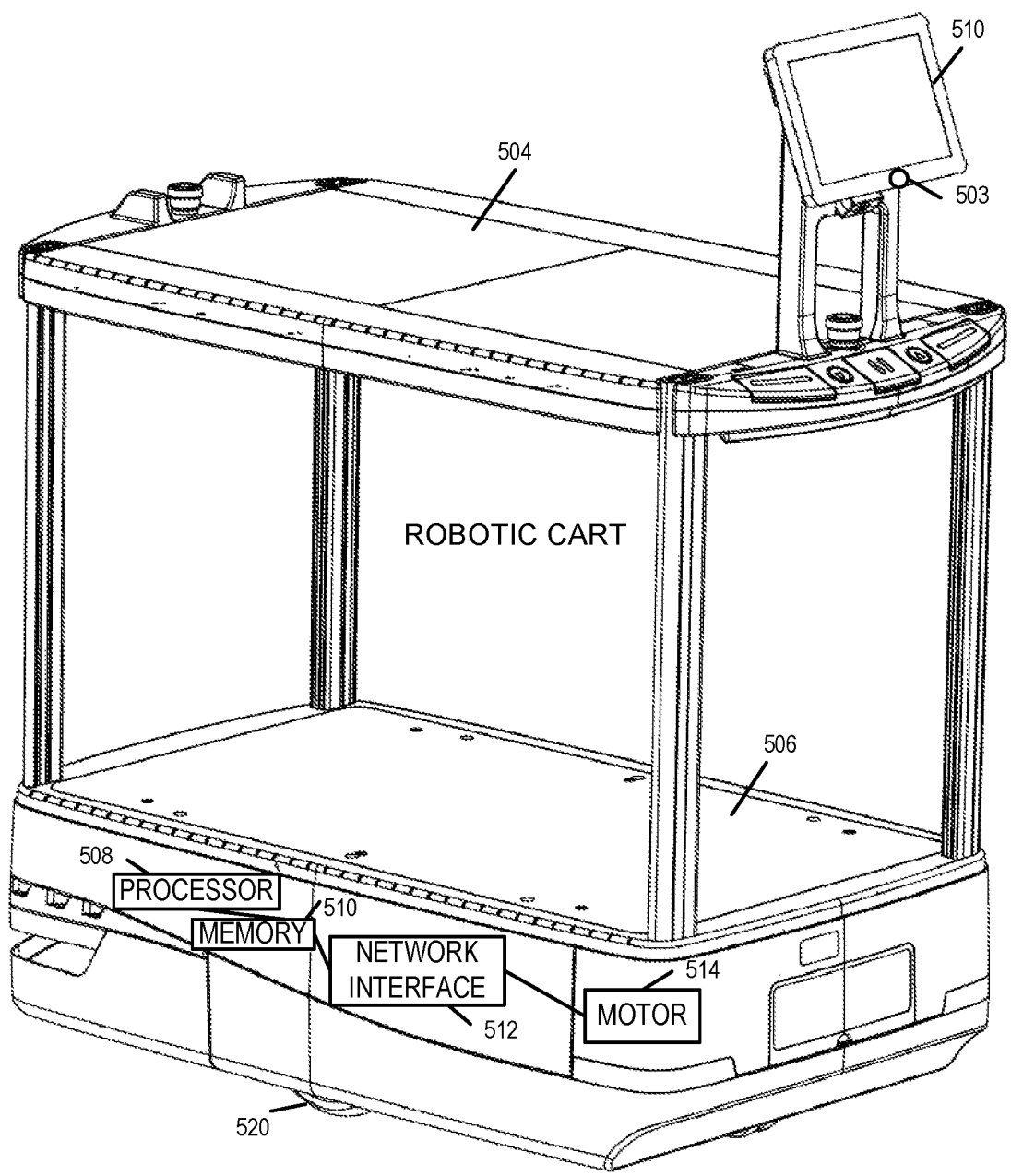
FIG. 5 shows an exemplary robotic pick cart used in some embodiments.

FIG. 5 shows a two shelf robotic cart 500 which can be used as any one of the robotic carts shown in the other figures including, for example robotic carts 242, 244, 246, 248. One or more receptacles can be and sometimes are transported on each of the shelves 504, 506 of the robotic cart 500. The robotic cart includes a processor 508, memory 510, network interface 512 motor 514 and wheels 520 which are driven by the motor 514. In addition to these components and shelves 504, 506 the cart 500 includes a user interface including display 510 and speaker 503. The network interface 512 is a wireless network interface capable of receiving commands and information from the order processing and control system 104 and sending information, e.g., cart location and order pick status information, to the order processing and control system via wireless signals. The memory 510 is used to store order and path information received from the order processing and control system 104. The order information includes information on the number of receptacles to be carried on the cart 500, there location on the cart 500 and which items are to be placed in the individual receptacles. The memory also store information used to prompt and guide a human operator to pick items as the robotic cart automatically travels through the warehouse under the control of processor 508 and/or one or more processors in the order processing and control system 104. The cart 500, through visual signals displayed on display 510 and/or audio instructions provided via speaker 503 instructs a human picker to pick particular items for an order and to place them in a receptacle on the cart which was allocated for the storage of the picked item. The processor 508 in the cart and/or system 104 also controls the robotic cart to move to/from the automatic pick cell and/or the packing and shipping area as needed as part of fulfillment of one or more orders.

While a two shelf cart embodiment is shown, multiple robotic cart configurations are possible with some carts being implemented using a single shelf while other cart have two or more shelves for carrying receptacles.

Various embodiments include one more or all of the following:
 1. A warehouse automation system adapted to improve warehouse operating productivity, the system comprising:
    a. a plurality of mobile robots for transporting items within a warehouse; and
    b. a plurality of cells for storing and transferring a plurality of items within a warehouse; and
    c. a controller adapted to associate a first one of the plurality of mobile robots with a first cell and to control the first mobile robot to move to and interact with the cell in the warehouse.
 2. Any of the preceding systems where the controller is located on an independent server locally or in the cloud.
 3. Any of the preceding systems where the controller is located on the cell.

4. Any of the preceding systems where the controller is located on the mobile robot.
5. Any of the preceding systems where the controller is distributed across multiple devices.
6. Any of the preceding systems in which the controller is adapted to associate a first one of the plurality of mobile robots with a person and to control the first mobile robot to lead the first person around the warehouse.
7. Any of the preceding systems where the controller is configured to assign a robot to travel to a cell for tasks first, then subsequently assign the robot to a person for additional tasks.
8. Any of the preceding systems where the controller is configured to assign a robot to travel to a person first for tasks, then subsequently assign the robot to a work cell for additional tasks.
9. Any of the preceding systems where the controller is configured to assign a task to the mobile robot based on current and future availability of the cells.
10. Any of the preceding systems where the controller is adapted to assign a task to the mobile robot based on the capabilities, inventory and supplies available at the cell
11. Any of the preceding systems where the controller is adapted to associate a second mobile robot with the first cell at the same time the first mobile robot is associated with the cell.
12. Any of the preceding systems where the controller is adapted to associate a second cell with the first mobile robot at the same time that the first cell is associated with the first mobile robot.
13. Any of the preceding systems where the first mobile robot carries at least one receptacle for storing items.
14. Any of the preceding systems where the first cell includes a device that removes and replaces receptacles located on the mobile robot.
15. Any of the preceding systems where the receptacles loaded back onto the first mobile robot may not be the same ones that were originally unloaded from it.
16. Any of the preceding systems where the first cell comprises at least one receptacle for storing items.
17. the system of claim #A where the inventory is located on manually placed receptacles such as totes on a shelf.
18. Any of the preceding systems where the inventory is located on a mobile robot.
19. Any of the preceding systems where the inventory is located on a conveyor
20. Any of the preceding systems wherein the inventory is located in receptacles stored in an automatic storage and retrieval system as is commonly used in the order fulfillment industry
21. Any of the preceding systems the first cell comprises an actuator capable of picking one or more individual items from the plurality of receptacles at the cell and placing them into a receptacle on the mobile robot or that has been unloaded from the mobile robot.
22. Any of the preceding systems, wherein the actuator is a robotic arm
23. Any of the preceding systems wherein the actuator is an X/Y/Z gantry/crane system
24. Any of the preceding systems wherein the actuator is an "each sorter" such as a tilt-tray sortation system using conveyor or mobile robots.
25. Any of the preceding systems, wherein the actuator may incorporate 'tossing' or ballistic trajectories to "throw" inventory into the mobile robot.
26. Any of the preceding systems the first cell is capable of picking an individual item from a source receptacle which contains a heterogeneous or homogeneous mix of items
27. Any of the preceding systems the first cell comprises an actuator capable of placing one or more individual items into one or more receptacles on the first mobile robot, either directly or through a transfer mechanism
28. Any of the preceding systems where the transfer mechanism is a passive device such as a chute or slide
29. Any of the preceding systems where the transfer mechanism is a buffering device that allows the cell to begin picking necessary items before the mobile robot is present. For example, a chute with a flap that prevents items from dropping until the robot arrives, or a conveyor platform.
30. Any of the preceding systems where the transfer mechanism implements a 'tossing' or ballistic trajectory to "throw" inventory into the mobile robot.
31. Any of the preceding systems further including a robotic arm with a mobile base that can go fetch own inventory for replenishment.
32. Any of the preceding systems where the first cell comprises a plurality of overhead sensors for identifying items in each receptacle
33. Any of the preceding systems mobile robot or controller is capable of communicating with the cell so that one or more items from one or more of the receptacles on the cell will be placed into one or more of the receptacles on the mobile robot
34. Any of the preceding systems where the cell is capable of communicating with the mobile robot to confirm that items have been correctly placed on the mobile robot
35. Any of the preceding systems where the mobile robot and cell are capable of coordinating with each other so that the mobile robot can safely move into and out of the cells work are without the mechanisms of either device interfering with the other.
36. Any of the preceding systems where the work to be done is communicated to the cell the necessary items and destination locations prior to arrival so that the cell can begin pre-picking items while the mobile robot is en-route
37. Any of the preceding systems where the first cell comprises a user interface to notify the first person of receptacles running low or empty of product
38. Any of the preceding systems where the first cell comprises of locations to which empty receptacles can be removed from the cell by a conveyor or mobile robotic device when they are empty
39. Any of the preceding systems where the first cell comprises of locations to which receptacles full of items can be installed by a conveyor or mobile robotic device
40. Any of the preceding systems where the system further comprising a display for displaying the status, work load and real time performance metrics of the cells.

List of Numbered Exemplary System Embodiments

1. A warehouse automation system (154), comprising: a first automated pick cell (201 or 211) for picking items corresponding to a first order; a control system (104) includes one or more processors (106, 108) configured to:
control the automated pick cell to load the items corresponding to the order onto a first robotic cart; and control the first robotic cart to guide the first robotic cart through a warehouse to pick items corresponding to the first order.

2. The warehouse automation system of numbered embodiment 1, wherein said control system (104) includes a control server (109) which is located in a warehouse or in a cloud service provider facility said one or more processors being part of said control server.

2A. The warehouse automation system of numbered embodiment 2, wherein said control server determines a number of items corresponding to the first order to be loaded into a first receptacle by the automated pick cell (e.g., tote) based on at least one of: item size information (453) indicating the size and/or shape of items in said first order; receptacle information (451) about the size, shape and/or volume of the first receptacle (e.g., information determined by the first server about how much the first receptacle can hold) and space information (471) about an amount of space to be left in said first receptacle for additional items to be placed in said receptacle as part of a manual pick following automated pick cell loading of the first receptacle with items corresponding to the first order.

2B. The warehouse automation system of numbered embodiment 2, wherein the control server (109) leaves a predetermined portion, (e.g., ⅓ or more of the first receptacle empty) for the placement of items as part of a manual pick operation following loading by the automated pick cell.

3A. The warehouse automation system of numbered embodiment 2, wherein said control server (109) determines a number of items corresponding to the first order to be loaded into a first receptacle as part of a manual pick operation based on at least one of:
item weight information (465) indicating the weight of individual items in said first order;
size information (453) indicating the size and/or shape of items in said first order;
information about the size, shape and/or volume of the first receptacle (e.g., information determined by the first server (109) about how much the first receptacle can hold) and
information (471) about an amount of space to be left in said first receptacle for additional items to be placed in said receptacle as part of n automated pick cell loading of the first receptacle with items corresponding to the first order following the manual pick operation.

3. The warehouse automation system of numbered embodiment 2, wherein said one or more processors (106, 108) are further configured to control the robotic cart to provide a human worker assigned to said first robotic cart item pick instructions via an interface on said first robotic pick cart to pick items as the first robotic pick cart moves through said warehouse.

3A. The warehouse automation system of numbered embodiment 3A, wherein the control system (104) controls the automated pick cell (201 or 211) to load the items corresponding to the order onto the first robotic cart before or after the first robotic cart is guided through the warehouse and items corresponding to the first order are loaded onto the first robotic cart as part of a guided human pick operation.

4. The warehouse automation system of numbered embodiment 1, wherein said control system (104) is further configured to assign the first robotic pick cart to travel to the first automated pick cell and then subsequently assign the robot to the human work for picking of additional items corresponding to said first order.

5. The warehouse automation system of numbered embodiment 1, wherein the first mobile robotic pick cart (244 or 246) carries at least a first receptacle (e.g., tote) for storing items; and wherein controlling the automated pick cell to load the items corresponding to the order onto the first robotic cart includes:
operating the automatic pick cell (201 or 211) to deposit picked items corresponding to said first order into said first receptacle.

6. The warehouse automation system of numbered embodiment 1,
wherein the first robotic cart (246) includes a first shelf (504); and wherein controlling the first automated pick cell (211) to load the items corresponding to the first order onto the first robotic cart (244) includes:
controlling the first automated pick cell (211) to load a first loaded receptacle (tote) including picked items corresponding to said first order onto said first mobile robotic pick cart (244).

6A. The warehouse automation system of numbered embodiment 2,
wherein the first mobile robotic pick cart (246) further includes a second shelf (506); and
wherein controlling the automated pick cell (211) to load the items corresponding to the first order onto the first robotic cart further includes:
controlling the first automated pick cell (211) to load a second loaded receptacle (260) (tote) including picked items corresponding to said first order onto the second shelf of the first robotic pick cart.

7. The warehouse automation system of numbered embodiment 6, wherein said control system is further configured to:
control the automated pick cell (211) to automatically remove an empty receptacle from said first mobile robotic pick cart (246) prior to loading said first loaded receptacle (262) onto said pick cart (246).

8. The warehouse automation system of numbered embodiment 1, wherein the first automated pick cell includes:
an actuator (233) (e.g., robotic arm) for picking one or more individual items from the plurality of storage areas of the automated pick cell under control of the control system and placing the picked items i) into a receptacle on the mobile robotic cart (246), ii) an empty receptacle unloaded from a mobile robotic cart (246), the mobile robotic cart (246) from which the empty receptacle was unloaded being the same or a different cart from said first robotic cart; or a transfer storage receptacle that can be unloaded directly onto the first mobile robotic cart (246).

9. The warehouse automation system of numbered embodiment 8, wherein the actuator (233) is a robotic arm.

9A. The warehouse automation system of numbered embodiment 8, wherein the actuator (233) is a tilt-tray sortation system which uses a conveyor or mobile robots.

9B. The warehouse automation system of numbered embodiment 8, wherein the actuator (233) is an X/Y/Z gantry/crane system.

9C. The warehouse automation system of numbered embodiment 8, where the actuator (233) is a tossing or ballistic trajectory actuator that throws or shoots the inventory into the tote located on the first mobile robotic cart.

9D. The warehouse automation system of numbered embodiment 8, where the actuator (233) is an X/Y/Z gantry/crane system 10. The warehouse automation system of numbered embodiment 8, wherein said system further comprises said transfer storage receptacle (212) that can be unloaded directly onto the first mobile robotic cart (246);

wherein said one or more processors (106, 108) are further configured to:

control said actuator to place the picked items corresponding to said first order into said storage receptacle; and control said storage receptacle to discharge the times corresponding to said first order onto said first robotic cart.

11. The warehouse automation system of numbered embodiment 8, wherein the storage receptacle (212) includes a chute (207) or slide for discharging the items corresponding to the first order into said robotic cart.

List of Numbered Exemplary Method Embodiments

12. A warehouse automation method, comprising:
receiving (304) order information including a list of items corresponding to an order; determine (306) a first set of items in said order which are to be autopicked and a second set of items in said order which are to be manually picked; control (330) an autopick cell to autopick said first set of items; and operate a robotic cart (336) to guide a human picker through a warehouse to manual pick items in said second set of items for said order.

13. The warehouse automation method (154) of embodiment 12 further comprising: determining (311) whether an autopick operation is to precede a manual pick operation; and controlling (312) the order of said autopick of said first set of items and a manual pick of items by the human picker based on the determined order of the autopick operation and the manual pick operation.

14. The method of numbered embodiment 12, wherein determining (311) whether an autopick operation is to precede a manual pick operation includes determining that the autopick operation is to precede the manual pick operation when items over a first predetermined weight are to be loaded as part of the autopick operation and no items over the first predetermine weight are to be loaded as part of the manual pick operation.

15. The method of numbered embodiment 12, wherein determining (311) whether an autopick operation is to precede a manual pick operation includes determining that the manual pick operation is to precede the autopick operation when items over a first predetermined weight are to be loaded as part of the manual pick operation and no items over the first predetermine weight are to be loaded as part of the autopick operation.

16. The method of numbered embodiment 12, wherein determining (311) whether an autopick operation is to precede a manual pick operation includes determining that the autopick operation is to precede the manual pick operation includes selecting to perform the autopick operation before the manual pick operation when performing the autopick operation will require less receptacles to satisfy the order than if the manual pick operation was performed first.

17. The method of numbered embodiment 12, wherein determining (311) whether an autopick operation is to precede a manual pick operation includes selecting to perform the manual pick operation before the autopick operation when performing the manual pick operation first will require less receptacles to satisfy the order than if the autopick operation was performed first.

Sometimes the receptacles, e.g., totes are for batch orders, i.e. collection of orders that are later sorted out, prior to shipping. Thus it should be appreciated that in some cases an order corresponds to an individual customer, while in other cases an order to be processed corresponds to multiple customer order which are combined and treated as a single order for pick purposes and then sorted into individual customer orders prior to shipment.

While in some embodiments empty receptacles, e.g., "empty totes" go into the pick cell in other cases where manual picking precedes auto-picking the receptacles will include items when they enter the pick cell, e.g., for "topping off". Even in pre-picking, a robot may visit multiple auto-picking cells and, in that case, the totes may not be empty even though auto picking is performed prior to manual picking in such cases.

The techniques of various embodiments may be implemented using software, hardware and/or a combination of software and hardware. Various embodiments are directed to apparatus, e.g., order processing systems, e.g. order processing servers, cloud servers, mobile sort walls, sorting kiosks, mobile robotic carts, warehouse devices, etc. Various embodiments are also directed to methods, e.g., method of controlling and/or operating a system, an order processing system, e.g. an order processing server, a cloud based server, automated pick cell, a sorting kiosk, mobile robotic carts, warehouse devices, customer devices, e.g. computers, laptops, mobile smart phones, etc., and/or communications devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of the elements are steps that are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., an order processing server, a sorting kiosk, a mobile sort wall, etc. are configured to perform the steps of the methods described as being performed by the devices. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., order processing server and control system and/or order fulfillment system, including a processor which includes a component corresponding to each of the steps of the various described methods performed by the device in which the processor is included. In some but not all embodiments a device, e.g., order processing server and control system and/or order fulfillment system, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., order processing server and control system and/or order fulfillment system, a mobile robotic cart, a customer device, or other device described in the present application. In some embodiments components are implemented as hardware devices in such embodiments the components are hardware components. In other embodiments components may be implemented as software, e.g., a set of processor or computer executable instructions. Depending on the embodiment the components maybe all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A warehouse automation system, comprising:
   an automated pick cell for picking items corresponding to an order;
   a control system includes one or more processors configured to:
      control the automated pick cell to load the items corresponding to the order onto a first robotic cart;
      control the robotic cart to guide the robotic cart through a warehouse to manually pick items corresponding to the order; and
      determine whether control of the automated pick cell is to precede control of the robotic cart to manually pick items corresponding to the order.

2. The warehouse automation system of claim 1, wherein said control system includes a control server which is located in a warehouse or in a cloud service provider facility said one or more processors being part of said control server.

3. The warehouse automation system of claim 2, wherein said one or more processors are further configured to control the robotic cart to provide a human worker assigned to said robotic cart item pick instructions via an interface on said robotic cart to pick items as the robotic cart moves through said warehouse.

4. The warehouse automation system of claim 1, wherein said control system is further configured to assign the robotic cart to travel to the automated pick cell and then subsequently assign the robotic cart to a human worker for picking of additional items corresponding to said order.

5. The warehouse automation system of claim 1,
   wherein the robotic cart carries at least a first receptacle for storing items; and
   wherein when controlling the automated pick cell to load the items corresponding to the order onto the robotic cart, the control system is configured to:
      operate the automatic pick cell to deposit picked items corresponding to said order into said receptacle.

6. The warehouse automation system of claim 1,
   wherein the robotic cart includes a shelf; and
   wherein when controlling the automated pick cell to load the items corresponding to the first order onto the first robotic cart, the control system is configured to:
      control the automated pick cell to load a loaded receptacle including picked items corresponding to said order onto said robotic cart.

7. The warehouse automation system of claim 6, wherein said control system is further configured to:
   control the automated pick cell to automatically remove an empty receptacle from said robotic cart prior to loading said first loaded receptacle onto said robotic cart.

8. The warehouse automation system of claim 1, wherein the automated pick cell includes:
   an actuator for picking one or more individual items from the plurality of storage areas of the automated pick cell under control of the control system and placing the picked items into at least one of: a receptacle configured for the robotic cart, and a transfer storage receptacle configured to be unloaded directly onto the robotic cart.

9. The warehouse automation system of claim 8, wherein the actuator is a robotic arm.

10. The warehouse automation system of claim 8,
wherein said system further comprises said transfer storage receptacle that can be unloaded directly onto the robotic cart;
wherein said one or more processors are further configured to:
control said actuator to place the picked items corresponding to said order into said storage receptacle; and
control said storage receptacle to discharge the items corresponding to said order onto said robotic cart.

11. The warehouse automation system of claim 8, wherein the storage receptacle includes a chute or slide for discharging the items corresponding to the first order into said robotic cart.

12. A warehouse automation method, comprising:
receiving order information including a list of items corresponding to an order;
determining a first set of items in said order which are to be autopicked and a second set of items in said order which are to be manually picked, and determining whether the first set of items are to be autopicked before or after when the second set of items are to be manually picked;
controlling an autopick cell to autopick said first set of items; and
operating a robotic cart to guide a human picker through a warehouse to manual pick items in said second set of items for said order.

13. The method of claim 12, further comprising:
determining whether an autopick operation is to precede a manual pick operation; and
controlling the order of said autopick of said first set of items and a manual pick of items by the human picker based on determining whether the autopick operation is to precede the manual pick operation.

14. The method of claim 12, wherein determining whether an autopick operation is to precede a manual pick operation includes determining that the autopick operation is to precede the manual pick operation when items over a first predetermined weight are to be loaded as part of the autopick operation and no items over the predetermined weight are to be loaded as part of the manual pick operation.

15. The method of claim 12, wherein determining whether an autopick operation is to precede a manual pick operation includes determining that the manual pick operation is to precede the autopick operation when items over a predetermined weight are to be loaded as part of the manual pick operation and no items over the predetermined weight are to be loaded as part of the autopick operation.

16. The method of claim 12, wherein determining whether an autopick operation is to precede a manual pick operation includes determining that the autopick operation is to precede the manual pick operation includes selecting to perform the autopick operation before the manual pick operation when performing the autopick operation will require less receptacles to satisfy the order than if the manual pick operation was performed first.

17. The method of claim 12, wherein determining whether an autopick operation is to precede a manual pick operation includes selecting to perform the manual pick operation before the autopick operation when performing the manual pick operation first will require less receptacles to satisfy the order than if the autopick operation was performed first.

* * * * *